INVENTOR.
ALBIN A. GRADISAR
BY GEORGE F. SCHENK
Herbert C. Kimball
ATTORNEY

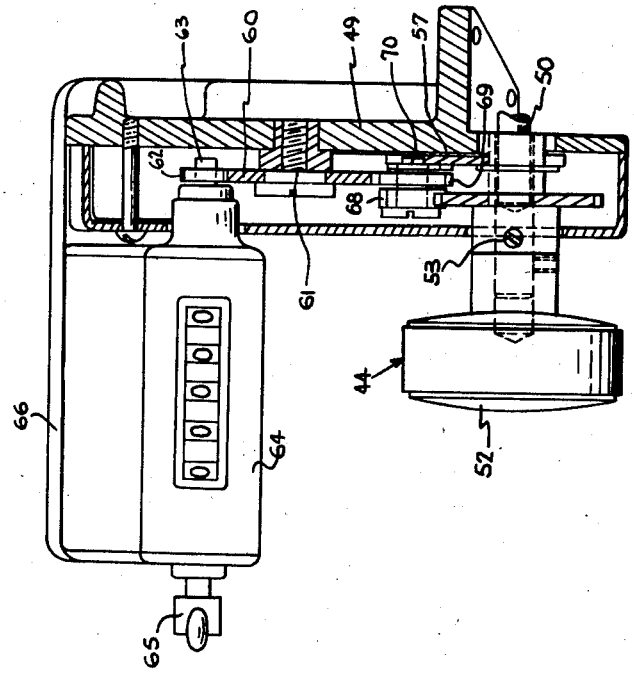
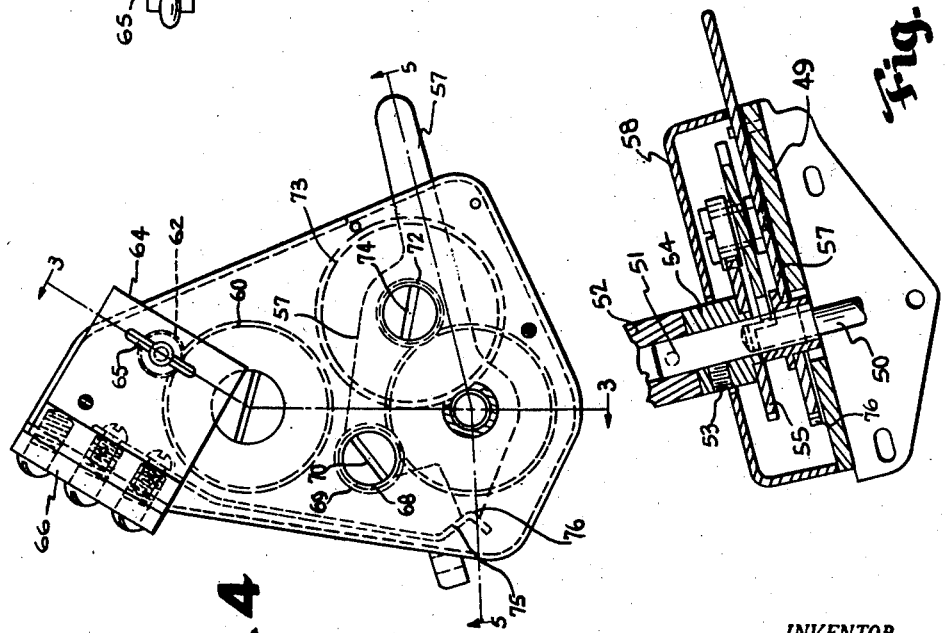
INVENTOR.
ALBIN A. GRADISAR
BY GEORGE F. SCHENK
Herbert C. Kimball
ATTORNEY Patented Feb. 4, 1947

2,415,281

UNITED STATES PATENT OFFICE 2,415,281

FILM PROJECTION APPARATUS

Albin A. Gradisar and George F. Schenk, Buffalo, N. Y., assignors to American Optical Company, Southbridge, Mass., a voluntary association of Massachusetts Application December 8, 1945, Serial No. 633,586

3 Claims. (Cl. 88—24)

This invention relates to projecting apparatus in which the material being projected onto a screen or the like may be shifted with great accuracy so as to move the projected image to a predetermined or desired position.

More particularly, the present invention is applicable to the gate of a projecting apparatus having an optical projection system which is adjustable to vary the size of image produced without varying the image plane of the system. Because with such variation in the size of image, a shifting of the gate through a unit distance will cause a particular detail of the image to be shifted more at large magnification than at small magnification, it has been necessary to devise a control for the shifting of the gate which will operate at more than one speed.

Accordingly, an object of the invention is to provide a counter connected to an actuating member of a slide for shifting the gate laterally, the connection to the counter including change speed gearing so that the counter records the adjustment of the slide at two different rates.

The invention is applicable to various projecting apparatus in which the optical projection system is adjustable to vary the size of image produced or where various magnifications of objects are projected on the screen. In order to clearly illustrate one embodiment of the invention, we have shown the control mechanism connected to projecting apparatus of the type disclosed and claimed in copending application for Projection apparatus, W. F. Peck et al., Serial No. 535,306, filed May 12, 1944.

In the accompanying drawings which illustrate the invention as applied to projection apparatus of the above identified type:

Fig. 3 is an enlarged view partly in section of the counter shown in Fig. 2 and driving connections therefor, the section being taken substantially on the line 3—3 of Fig. 4;

Fig. 4 is an end elevation looking from the left of Fig. 3, the control knob being omitted; and Fig. 5 is a detailed sectional view, the section being taken on the axis of the control knob.

Figure 2:
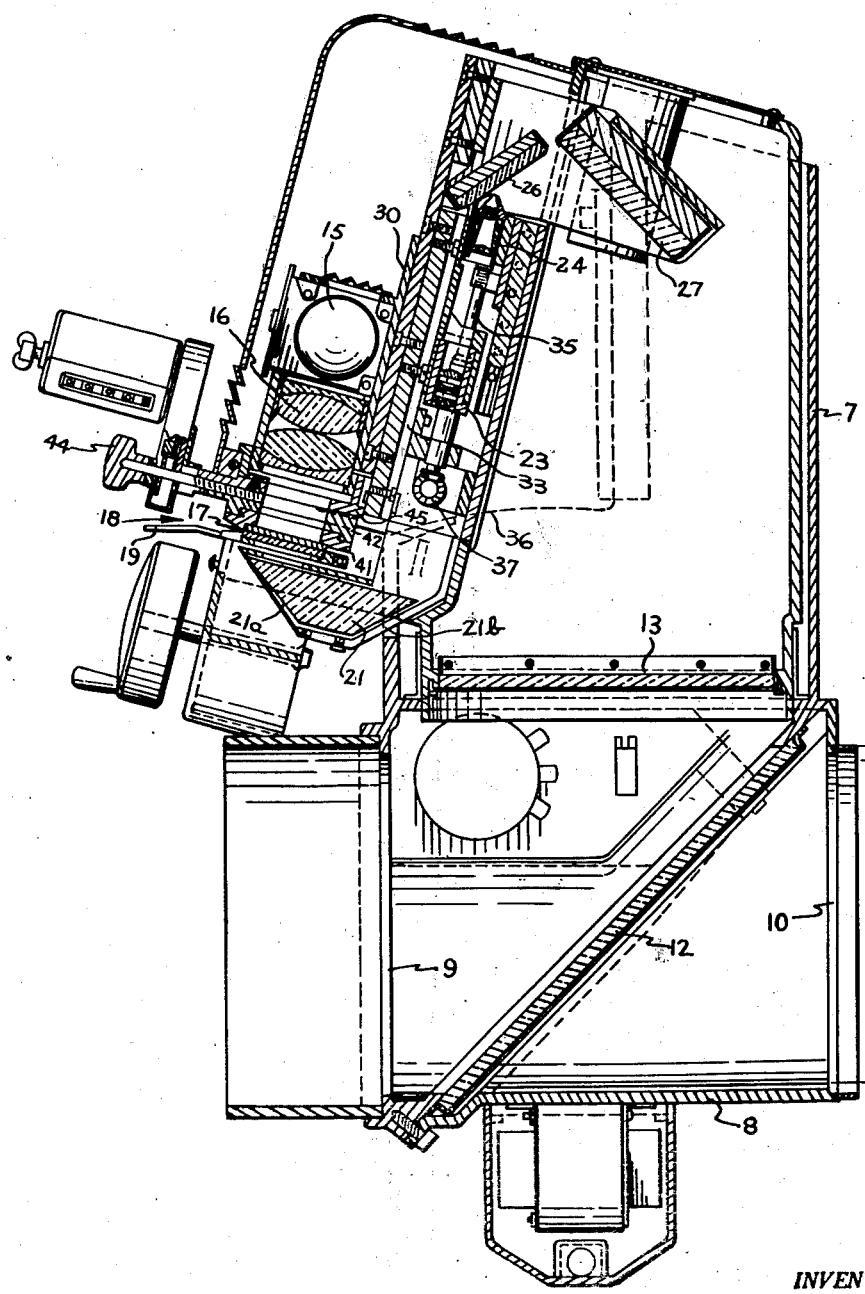
Fig. 2 is a central sectional view taken on the line 2—2 of Fig. 1 looking in the direction of the arrows.

The projecting apparatus which has been selected for illustration is self-contained in that the light source with the cooperating condensing lenses, the objective and occular, the reflectors and a translucent screen for receiving the projected image are grouped compactly together and carried by a mount 7 (see Fig. 2). The mount 7 extends from a cylindrical housing 8 which has aligned openings 9 and 10.

A partial reflector 12 within the cylindrical housing 8 is inclined at such an angle (approximately 45°) as to permit the observer to look through the aligned openings 9 and 10 and match the image appearing on the translucent screen 13 of the projecting apparatus with a chart or the like which can be seen through the opening 10.

Referring to the projecting apparatus which is best seen in Fig. 2 the light source is a lamp 15 with which the condensing lenses 16 cooperate for passing a concentrated beam of light through the material, generally a film or plate, which is to be projected and which is held between the pressure plates 17 of the film gate indicated in general by the numeral 18. By means of the handle 19 the pressure plates may be separated during movement of the film from reel 20 to reel 20A to prevent scratching or marring of the surface thereof.

The light transmitted through the material in the gate 18 is returned in a direction substantially parallel to the axis of the condensing lenses 16 by a double reflecting prism 21 having a reflecting face 21A in alignment with the film gate and a second reflecting face 21B in alignment with the projection objective.

With this objective 23 cooperates an ocular 24. In order that the image produced by the ocular 24 may be projected upon the screen 13, a reflector 26 is aligned with the ocular and a second reflector 27 cooperates therewith to direct the light rays to the screen 13.

In this projection apparatus the object plane (determined by the pressure plates 17) and the image plane (determined by the translucent screen 13) do not vary; but the extent to which the image is magnified is varied by changing the optical spacing of the objective 23 and the ocular 24. For proper illumination at all times, the lamp 15 together with the condensing lenses 16 are moved along the optical axis simultaneously with the change in optical spacing of the objective 23 and ocular 24. The shifting of the lamp 15 and condensing lenses 16 is so controlled that the condensing lenses 16 continuously image the filament of the electric lamp 15 approximately at the first focal point of the objective 23.

More specifically the lamp 15 and the condensing lenses 16 are both mounted on a slide 30 which is adjusted longitudinally of the optical axis upon rotation of the control knob 31.

This same control knob 31 controls the size of the projected image on the screen 13 in that rotation of the control knob 31 causes differential movement of the objective 23 and ocular 24.

As a further refinement, the objective 23 is adjustably mounted on the gib 33 so that the image may be more clearly focused on the screen 13.

Figure 1:
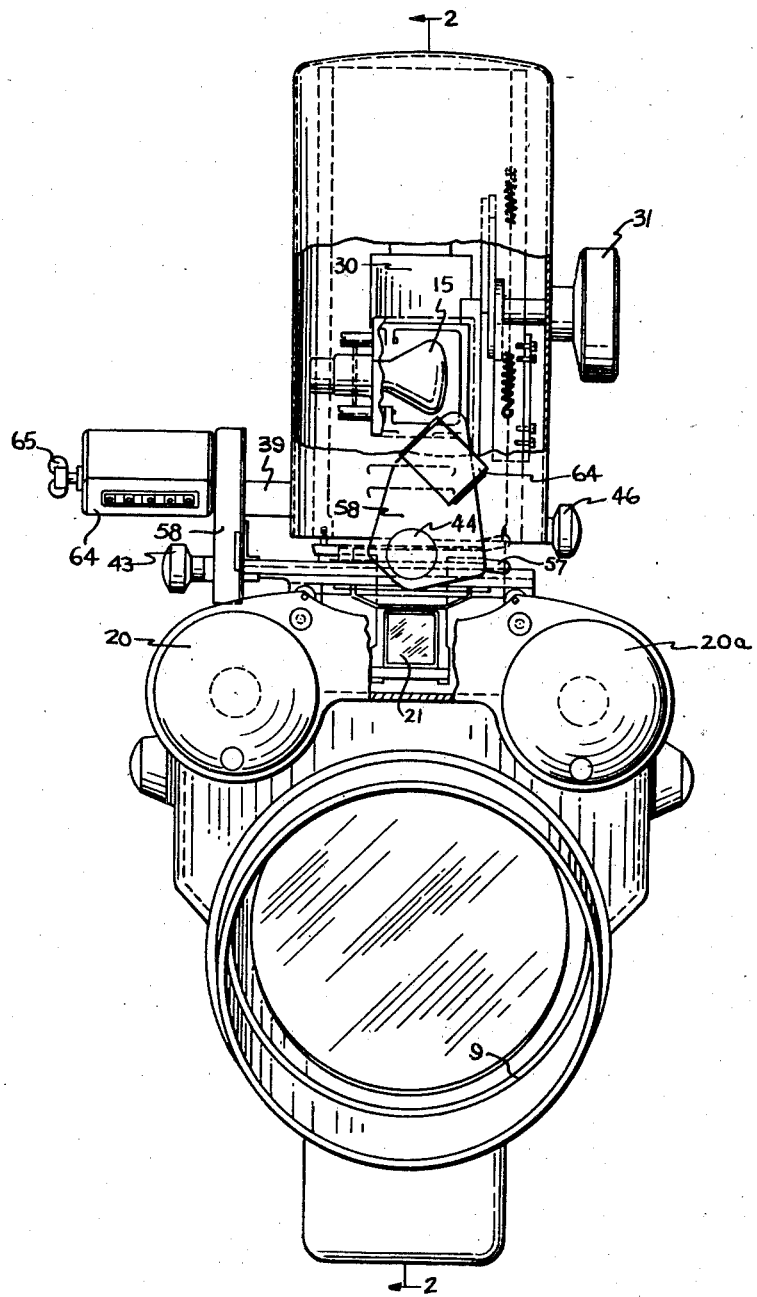
Fig. 1 is a view in front elevation of projection apparatus provided with the control mechanism embodying the invention.

For adjustment of the ocular 24 there is provided a screw 35 driven by miter gears 36 and 37. The screw 35 adjusts the position of the cam which brings about differential movement of the ocular 24 with respect to the objective 23. The miter gears are actuated by the knob 39 (see Fig 1).

In order to vary the magnification of image observed on the screen 13, the control knob 31 is rotated. This control knob is connected not only to the ocular 24 and objective 23 but also to the slide 30 carrying the lamp 15 and condensing lenses 16 and the movement of the slide 30 is so calculated as to image the filament of the lamp 15 approximately at the first focal point of the objective 23 as the latter is moved toward and away from the object plane along the optical axis of the projecting system. As the control knob 31 is rotated the ocular does not move at the same rate as the objective, but the ocular moves in the same direction as the objective only until the mid-point of the excursion of the objective is reached at which time the ocular 24 reverses its direction of movement and moves in the opposite direction until it reaches its original position. At this point the limit of variaton of magnfication has been reached.

The film gate 18 and the control mechanism therefor, to which the present invention more particularly pertains, includes the pressure plate 17. The film gate itself 18 is mounted on cross slides 41 and 42 at right angles to each other. The cross slide 41 is actuated by a screw 43 and the cross slide 42 is actuated by a screw 44. In addition, the film gate may be rotated by means of a turntable 45, rotation of the turntable, being affected by a tangent screw 46 (see Fig. 1).

When a screw 43 or 44 is rotated to shift its respective slide 41 or 42 transversely relative to the optical path of the projecting lens system, the image is correspondingly shifted on the screen 13. In order to accurately control such lateral shifting or in order to accurately measure the extent to which the image has been shifted, a counter is operatively connected to each of the two screws 43 and 44. Since both mechanisms are practically identical only the control mechanism for the screw 44 will be described.

The shaft 50 of the screw extends through a bracket plate 49.

The screw 44 has been described as a unitary element; but for convenience in assembling and manufacture the same may comprise in addition to the shaft 50 an extension shaft 51 carrying the knob 52. To the extension 51 is secured by means of a set screw 53 a sleeve 54 carrying a gear 55. This gear is of course driven by the screw 44.

This gear 55 and a gear support in the form of a shift lever 57 (see Fig. 1) are enclosed within a housing 58. The support 57 is pivoted on the sleeve 54 to swing about the axis of the gear 55. This support or shift lever 57 mounts two gear couples, one gear of each gear couple being continuously in mesh with the gear 55. As is clearly apparent from Fig. 4, upon swinging the support or shift lever 57 in one direction the other gear of the high speed gear couple is caused to mesh with the idler gear 60 and when the support 57 is swung in the opposite direction the other gear of the lower speed gear couple is caused to mesh with the idler gear 60. This idler gear 60 is mounted on a stud 61 (see Fig. 3) and meshes with a pinion 62 on the drive shaft 63 of the counter 64. The counter 64 may be of the usual commercial form such as a high-speed counter known as Modified Veeder-Root catalog #640–28 and provided with the reset knob 65. This counter 64 is mounted on an extension 66 of the plate bracket 49.

The low speed gear couple comprises a pair of gears 68 and 69 mounted on a stud 70 carried by the support 57 and the high speed gear couple comprises gears 72 and 73 mounted on a stud 74 carried by the support 57.

A spring actuated click 75 is arranged to drop into a notch 76 in the support 57 in neutral position of this support or shift lever 57. This holds both gear couples out of mesh with the idler gear 60.

When the observer, looking through the aligned openings 9 and 10, desires to accurately match the projected image with a chart or the like upon which the image is superposed due to the partial reflector 12, either the screw 43 or the screw 44 is rotated until desired placing or coincidence is obtained. The accurate amount of the angle of rotation of the screw is recorded by the counter 64. Because of the difference in magnification brought about by, the differential movement of the objective 23 and ocular 24, or by varying the magnifications of the film, it is necessary to rotate the counter 64 at different speeds. This is accomplished as above explained by the swinging of the support or shift lever 57 so that either the high speed or the low speed gear couple is brought into mesh with the idler gear 60. As a result, the accurate control of the position of the gate 18 is made possible even though the projecting apparatus has variable magnifications.

While we have illustrated and described a preferred embodiment which our invention may assume, it will be understood that our invention may be otherwise embodied and practiced within the scope of the following claims.

We claim:

1. In projecting apparatus having an optical projection system adjustable to vary the size of image produced without varying the image plane of said system, the combination of a gate for positioning the material to be projected in the object plane of said system, a slide for shifting said gate laterally in said object plane relative to the optical path of said system, a rotatable actuating member for said slide, a counter for indicating the angle through which said actuating member is rotated, and change speed gearing operatively connecting said counter to be driven by said actuating member at either of two speeds selectively including a gear driven by said actuating member; a support pivotally mounted on the axis of said gear, a high speed gear couple and a low speed gear couple both carried by said support and both meshing with said first mentioned gear, and a counter driving gear positioned to mesh with and be driven by one of said gear couples when said support is swung in one direction and to mesh with and be driven by the other gear couple when said support is swung in the other direction.

2. In projecting apparatus having an optical projection system adjustable to vary the size of image produced without varying the image plane of said system, the combination according to claim 1 including a spring actuated click for maintaining said gear support in neutral position, neither gear couple being in mesh while said support is in said position.

3. In projecting apparatus having an objective and an ocular and means for changing the optical spacing therebetween to vary the size of image produced without varying the object and image planes of said system, the combination of a gate for positioning a film to be projected in the object plane of said objective, a slide for shifting said gate laterally in said object plane relative to the optical path of said lens system, a screw for actuating said slide, a counter for indicating the angle through which said screw is rotated, and change speed gearing operatively connecting said counter to be driven by said screw at either of two speeds selectively including a gear driven by said screw, a shift lever pivotally mounted on the axis of said gear, a high speed gear couple and a low speed gear couple both carried by said lever and both meshing with said first mentioned gear, and a counter driving gear positioned to mesh with and be driven by one of said gear couples when said lever is swung in one direction and to mesh with and be driven by the other gear couple when said lever is swung in the other direction.

ALBIN A. GRADISAR.
GEORGE F. SCHENK.